US006826668B1

United States Patent
Hsu et al.

(10) Patent No.: US 6,826,668 B1
(45) Date of Patent: Nov. 30, 2004

(54) SYSTEM AND METHOD FOR REORGANIZING DATA ON A DISK DRIVE TO IMPROVE SPATIAL LOCALITY

(75) Inventors: Windsor Wee Sun Hsu, Sunnyvale, CA (US); Shauchi Ong, San Jose, CA (US); Honesty Cheng Young, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 09/412,902

(22) Filed: Oct. 5, 1999

(51) Int. Cl.⁷ .............................................. G06F 12/00
(52) U.S. Cl. ...................................................... 711/167
(58) Field of Search ................................ 711/113, 118, 711/126, 137, 167, 170, 202, 209, 207, 206, 210, 159, 100

(56) References Cited

U.S. PATENT DOCUMENTS

| | | | |
|---|---|---|---|
| 4,680,703 A | 7/1987 | Kriz ............................ 711/112 |
| 4,956,803 A | 9/1990 | Tayler et al. ................ 711/113 |
| 5,297,258 A | 3/1994 | Hale et al. ................... 711/114 |
| 5,394,537 A | 2/1995 | Courts et al. ............... 711/202 |
| 5,649,153 A | 7/1997 | McNutt et al. ............. 711/118 |
| 5,682,500 A | 10/1997 | Vishlitzky et al. ......... 711/113 |
| 5,694,571 A | 12/1997 | Fuller ......................... 711/113 |
| 6,065,104 A | * 5/2000 | Tng ............................ 711/209 |
| 6,088,758 A | * 7/2000 | Kaufman et al. ........... 711/100 |
| 6,112,285 A | * 8/2000 | Ganapathy et al. ........ 711/207 |
| 6,119,214 A | * 9/2000 | Dirks .......................... 711/206 |
| 6,131,147 A | * 10/2000 | Takagi ........................ 711/159 |
| 6,138,226 A | * 10/2000 | Yoshioka et al. .......... 711/210 |

* cited by examiner

Primary Examiner—David Hudspeth
Assistant Examiner—Fred F. Tzeng
(74) Attorney, Agent, or Firm—John L. Rogitz

(57) ABSTRACT

A computer-implemented method for clustering related data pages in close physical proximity to each other on a magnetic disk drive or other storage device. The method includes identifying relationships between the pages, with the relationships being established not simply by time of page access, but rather by user access patterns. The pages are clustered based on the relationships. To undertake the clustering, the pages and references can be represented and analyzed as respective vertices and edges in edge graphs.

25 Claims, 3 Drawing Sheets

ARCHITECTURE

EXAMPLE GRAPH

SYSTEM AND METHOD FOR REORGANIZING DATA ON A DISK DRIVE TO IMPROVE SPATIAL LOCALITY

BACKGROUND OF THE INVENTION

1. Field of the Invention

The present invention relates generally to improving the data transfer efficiency of a magnetic disk or other form of data storage in which sequential access is faster than random access.

2. Description of the Related Art

The speed with which a magnetic disk drive transfers data depends on the time consumed in positioning the head of the drive over the appropriate location on the disk and then waiting for the appropriate section of the disk to rotate under the head. This is referred to as "access time". Furthermore, the speed with which a magnetic disk drive transfers data depends on "transfer time", i.e., the time consumed in actually transferring the data, once the head is properly positioned over the appropriate disk section.

Data is typically requested in large blocks so that transfer time dominates access time, thereby more effectively using the bandwidth of the disk drive. Unfortunately, as recognized by the present invention the constituents of the desired stream of data frequently are not stored in physically adjacent locations because it may not be known apriori that the constituents later will be related by a user and, hence, accessed as a related combination of data. This prolongs access time. To minimize access time and thereby further improve the performance of a disk drive, the present invention understands that it is preferable to group data on the disk such that related constituents are physically close together (the data has "spatial locality") and, hence, the disk drive reads relatively large blocks of data while minimizing access time.

U.S. Pat. Nos. 5,694,571, 5,394,537, and 4,680,703 cluster pages of data on a disk physically close together on the fly, every time a page is fetched. In other words, in the above-referenced patents data pages are clustered based on when they are first accessed. As recognized herein, such clustering schemes, while simple, result in the excessive movement of pages including during peak disk drive workloads. Moreover, they impose an overly simplistic reference pattern on the storage scheme that might not accurately reflect subsequent actual usage patterns. Further, a page of data might be appropriately included in more than a single group of pages, a recognition of the present invention that is not accounted for in the above-referenced patents. As recognized by the present invention, an improved data page clustering scheme can be provided that more accurately reflects actual usage patterns and, hence, that more robustly and effectively improves disk drive performance than existing clustering systems.

SUMMARY OF THE INVENTION

A storage device controller is disclosed that includes a data storage device having a program of instructions that is readable by the controller for clustering pages based on user access patterns over time that establish referential relationships between pages. The program of instructions embodies method steps that include representing data pages as respective vertices in a graph G. The edges define respective weights that represent the likelihood that the respective pages will be accessed contemporaneously. Additionally, the method steps embodied by the program of instructions further include defining an analysis graph C having a vertex u, and, based at least on the weights of the edges, adding vertices and edges to the analysis graph C. At least portions of the analysis graph C are output as being representative of a cluster of related pages.

In a preferred embodiment, the logic undertaken by the controller further includes storing related pages physically close together on a data storage medium, using at least the portions of the analysis graph C. Also, the preferred logic includes topologically sorting the analysis graph C, prior to outputting the cluster. Moreover, the logic includes storing at least a first page physically close to either at least a first cluster of pages related to the first page, and/or at least a second cluster of pages related to the first page. If desired, the logic can include storing the first page with the first cluster and with the second cluster in a reorganized area of the storage medium while leaving the first page stored in an original location on the storage medium.

As set forth in greater detail below with respect to the preferred implementation, the vertex u of the analysis graph C is a vertex associated with a heaviest weight edge in the graph G. In this embodiment, the logic includes creating a vertex w in the graph G, with the vertex w representing the analysis graph C, and then duplicating edges (IN(u),u) as (IN(u),w) and duplicating edges (u,OUT(u)) as (w,OUT(u)). A heaviest edge originating or ending in the vertex w and having an associated second vertex not present in the analysis graph C is identified, and the associated second vertex is added to the analysis graph C. For each vertex x in the analysis graph C, edges between the vertex x and the associated second vertex are removed from the graph G and added to the analysis graph C, prior to sorting the vertices (pages).

In another aspect, a computer-implemented method is disclosed for clustering related data pages in close physical proximity on a data storage medium. The method includes identifying relationships between the pages, with the relationships being established by more than time of page access. Also, the method includes clustering the pages based on the relationships.

In still another aspect, a computer program device includes a computer program storage device readable by a digital processing apparatus and a program means on the program storage device. The program means includes instructions that are executable by the digital processing apparatus for clustering related pages on a data storage medium. The logic by which this is undertaken includes identifying pages and relationships between the pages, with the relationships being established based on user accesses of the pages. The relationships are characterized by respective weights established at least in part based on user accesses of the pages. Based on at least the weights, pages are associated in clusters of related pages.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
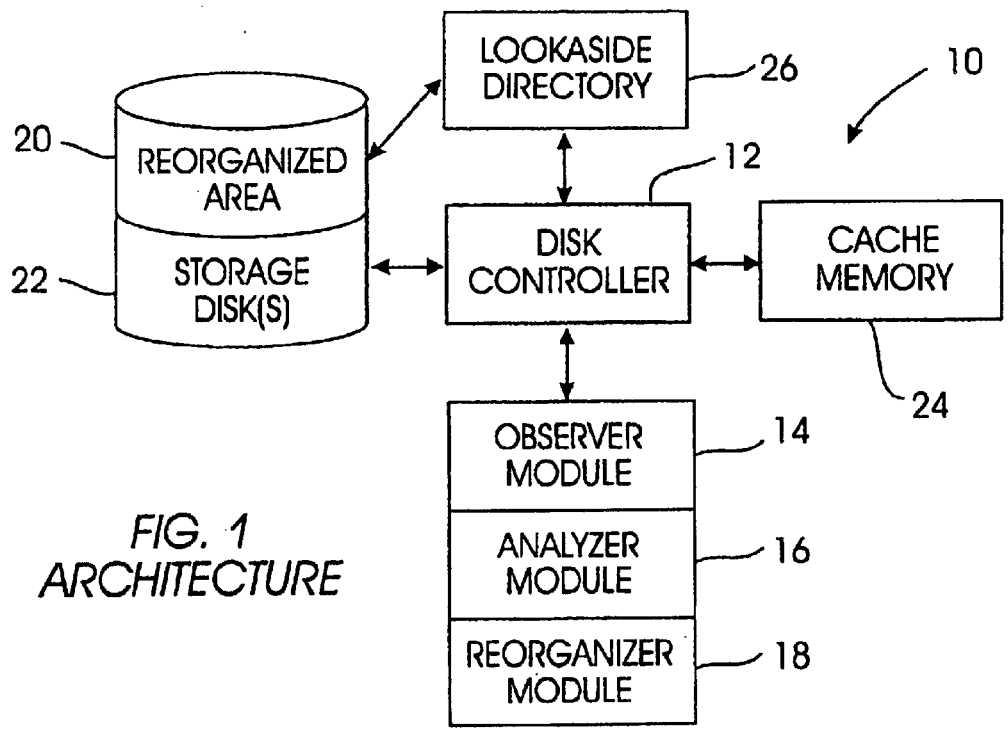
FIG. 1 is a schematic diagram of the architecture of the present system.

Referring initially to FIG. 1, a system 10 is shown for identifying relationships between data pages and clustering related pages together. In the particular architecture shown, the system 10 includes a digital processing apparatus, such as a magnetic disk drive controller 12. Any computer, however, can undertake the logic of the controller 12, including, for instance, a personal computer or laptop computer made by International Business Machines Corporation (IBM) of Armonk, N.Y. It is to be understood that while the present disclosure, for illustration purposes, refers to a "magnetic disk drive" controller, the principles set forth herein are applicable to other forms of storage where sequential access is faster than random access, such as, but not limited to, RAID systems. For example, the principles set forth herein can also be applied to logical blocks, e.g., files at the file system level.

As disclosed in greater below, the controller 12 accesses a software-implemented observer module 14 that records user requests for pages, i.e., user access patterns. Also, the controller 12 accesses an analyzer module 16 that executes the logic shown in FIG. 3 below to identify clusters of related pages, based on the user access patterns. Furthermore, the controller 12 accesses a reorganizer module 18 that stores groups of related pages, referred to herein as "segments", in close physical proximity to each other in a reorganized area 20 of a storage medium 22, e.g., one or more magnetic storage disks. Preferably, the segments are sized as multiples of the track size of the disk 22, to further optimize the performance of the present system. It is to be understood that the present logic can be embodied in fewer than three modules or more than three modules.

The observer module 14 can be perpetually active, or it can be invoked only when one or more of the following conditions occur. Specifically, the observer module 14 can be invoked when the controller 12 encounters large average seek distance, bursty I/O requests, or by receiving an explicit instruction through a jumper or other interface. The analyzer module 16, on the other hand, can be invoked perpetually or when interesting page fetch patterns are observed, or when the disk 22 becomes idle, etc. The reorganizer module 18, in contrast, preferably is invoked only when analyzed pages are available for reorganization and/or when the disk 22 is idle.

In any case, the modules 14, 16, 18 may be executed by a processor within the controller 12 as a series of computer-executable instructions. These instructions may reside, for example, in RAM of the controller 12.

Alternatively, the instructions may be contained on a data storage device with a computer readable medium, such as a computer diskette. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code.

FIG. 1 also shows that the system 10 can include a cache memory 24 that is sufficiently large to hold an entire segment, i.e., cluster of related pages. The controller 12 can also access a lookaside directory 26 that lists the pages contained in the reorganized area 20 of the disk 22.

Figure 2:
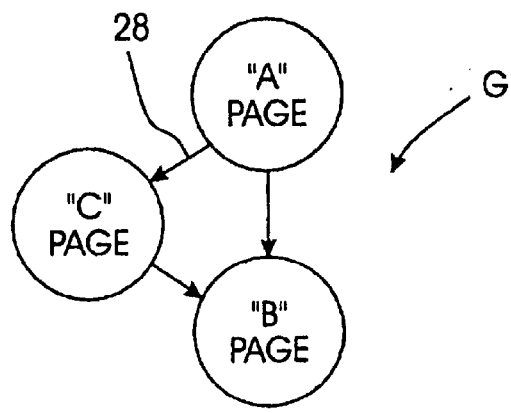
FIG. 2 is an example graph representing pages and relationships therebetween as vertices and edges in a graph.

FIG. 2 shows an illustrative graph "G" having vertices A–C that represent data pages. Also, the graph G includes edges 28 that represent relationships between the pages, as observed by the observer module 14. As used herein, the term "relationship" means a user-established relationship or a relationship derived from page access patterns. Furthermore, the edges 28 define respective weights that are representative of the respective strengths of the relationships between the pages. Accordingly, if, for example, the page "B" has been accessed twice immediately following an access of the page "A", or if some other referential relationship exists twice as much or twice as frequently as a unit referential relationship, the weight of the edge between the vertices A and B would be two.

In any case, the relationships between pages are established by more than time of page access, and more specifically are established based on user access patterns over time. More specifically, the observer module 14 maintains a sliding window of the last "N" pages that have been referenced immediately prior to the current page, wherein "N" is an integer preferably greater than two. When a page is referenced, the observer module 14 adds edges from these last N pages to the referenced page.

As an example, suppose pages A–D have been referenced in the order: ABCDBACD. In this case, edges are added from A to B, from B to C, from C to D, from D to B, B to A, A to C, and C to D. In this example, the edge C to D would have a weight of two, while the remaining edges have a weight of one. As recognized by the present invention, however, only pair-wise patterns are recognized by the above process; accordingly, edges from the last "N" pages are added to the current page to account for strings of more than two pages that might be repeatedly referenced together, and to account for page relationships that can repeat in more than one particular sequence.

Figure 3:
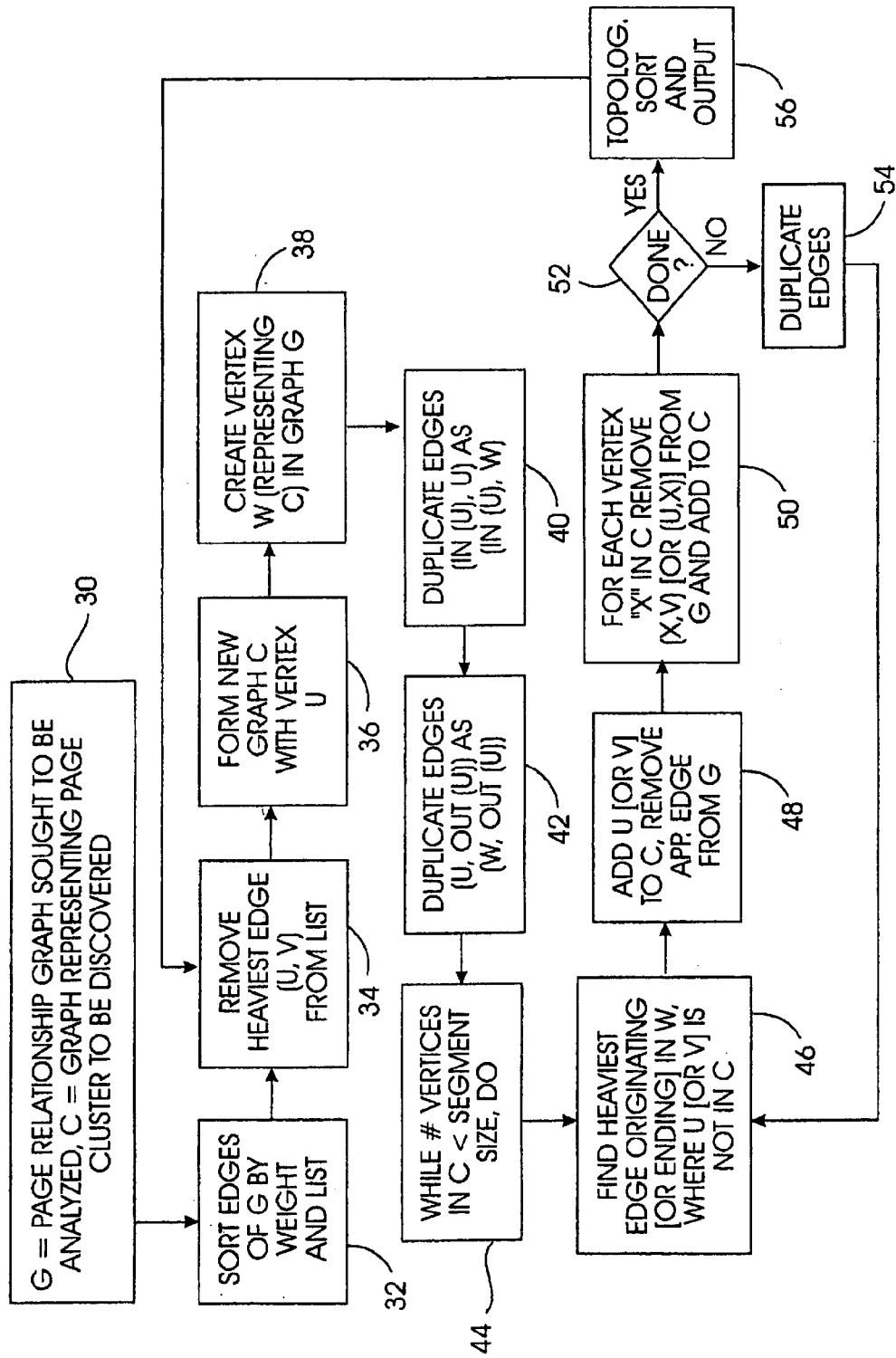
FIG. 3 is a flow chart of the present clustering logic.

FIG. 3 shows a preferred logic of the analyzer module 16 for clustering pages that are referenced together by users. State 30 indicates that the graph G represents the page relationship sought to be analyzed, and that an interim analysis graph C represents the page clusters (i.e., relationships) to be discovered. It is to be understood that the symbol IN(u) represents the set of vertices having edges terminating in the vertex u, whereas OUT(u) represents the set of vertices having edges originating in the vertex u. An edge from a vertex u to a vertex v is designated (u,v).

Moving to block 32, the edges 28 of the graph G are sorted by weight and listed. The heaviest edge (u,v) is then removed from the sorted list at block 34, with the originating vertex u of the heaviest edge being used as a vertex for the initially empty analysis graph C at block 36. Additionally, the logic, at block 38, creates an analysis vertex w in the graph G, with the vertex w representing the analysis graph C.

Proceeding to block 40, edges terminating in the originating vertex u of the heaviest edge are duplicated as edges that terminate in the analysis vertex w. In other words, at block 40, edges (IN(u),u) are duplicated as edges (IN(u),w). Similarly, at block 42 edges originating from the originating vertex u of the heaviest edge are duplicated as edges that originate in the analysis vertex w. In other words, at block 42, edges (u,OUT(u)) are duplicated as edges (w,OUT(u)).

The logic then continues to block 44 wherein an iterative DO loop is executed as long as the number of vertices in the analysis graph C (i.e., the number of pages clustered together by the logic) is less than a predefined segment size. Proceeding to block 46, the logic identifies the heaviest of the edges ending or originating in the analysis vertex w from a vertex that has not been previously added to the analysis graph C. Stated differently, at block 46 the logic identifies the heaviest edge (w,v) or (u,w) for u,v ∉ C.

Next, the logic moves to block 48, wherein the vertex associated with the edge identified at block 46 is added to the analysis graph C and wherein the edge identified at block 46 is removed from the graph G. Then, at block 50, for each vertex x in the analysis graph C, the corresponding edges in the graph G between the vertex x and the vertex associated with the edge identified at block 46 (i.e., u or v) are removed from the graph G and added to the analysis graph C. In other words, for each vertex x in C, (x,v) [or (u,x)] is removed from G and added to C.

At decision diamond 52 it is determined whether the number of vertices in the analysis graph C remains less than the predefined segment size, and if so, the logic proceeds to block 54 wherein the edges (IN(u),u) are once again duplicated as edges (IN(u),w) and edges (u,OUT(u)) are duplicated as edges (w,OUT(u)). It is to be understood that if "v" is the chosen vertex, then it is duplicated. The logic at blocks 46–50 is then repeated. On the other hand, once the size of the page cluster as represented by the number of vertices in the analysis graph C equals the segment size, indicating that the analysis is complete, the logic moves to block 56 to topologically sort the pages (vertices) in the analysis graph C such that the vertices can be output in a linear order with all the edges pointing in the same direction, e.g., to the right. The sorted pages are output to the reorganizer module 18, which can store the cluster in the reorganized area 20 of the disk 22. The analysis graph C and analysis vertex w are emptied and the process, starting at state 34, is repeated as desired to generate additional page clusters. Pages that have been associated with clusters are listed in the lookaside directory 26 (FIG. 1).

It is to be understood that original copies of the pages can remain stored at their original locations on the disk 22. Moreover, it can now be appreciated that with the above logic, any given page can appear in more than one cluster in the reorganized area 20, with the result being that multiple respective copies of a page might appear in respective clusters with which the page has been associated by the logic above.

Figure 4:
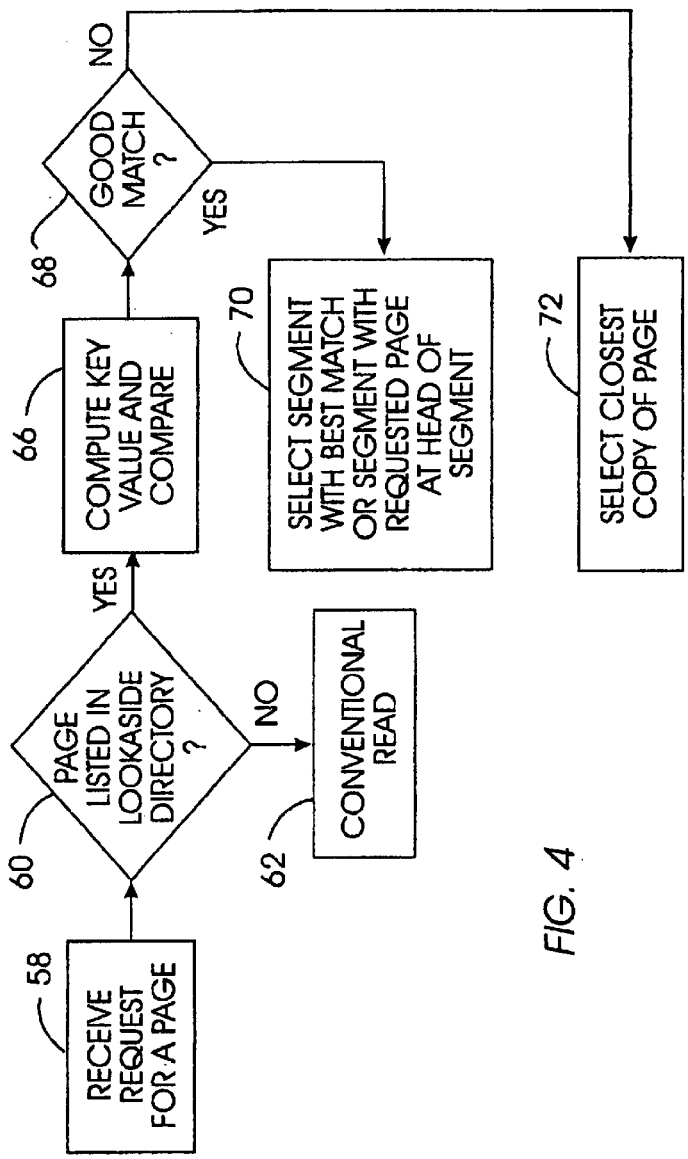
FIG. 4 is a flow chart of the logic for fulfilling a request for a page.

Now referring to FIG. 4, the preferred logic for retrieving a requested page can be seen. When a request for a page is received at block 58, the lookaside directory is probed decision diamond 60, and it is determined whether the page is listed in the lookaside directory 26. If not, a conventional read of only the requested page is executed at block 62.

Figure 5:
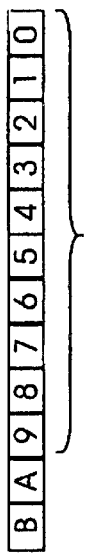
FIG. 5 is a schematic representations of how pages can be arranged on a disk.

Because a requested page can exist in more than one segment (cluster), a choice can arise in selecting which segment to fetch. Per the present invention, one way to make the selection is to associate, with each page in a segment, a respective key value. The key value is a function of the preceding m pages that have been referenced. To compute the key value, the pages most likely to precede the segment are first determined by, e.g., using the logic shown in FIG. 3 to form a segment with m extra pages, it being understood that the m extra pages are not part of the segment but are used only to calculate the key values. FIG. 5 represents such a scheme, with the squares labelled "A" and "B" representing m extra pages (m=2 in the example shown) that are associated with pages 0–9 of a cluster. Alternatively, a special key value for the first m pages of a segment can be used, denoting them to be at the head of the segment. A sliding window is maintained of pages that have been recently referenced.

With the above discussion in mind, it may now be appreciated that if the page appears in the lookaside directory as determined at decision diamond 60 of FIG. 4, the logic moves from decision diamond 60 to block 66, wherein a key value for the page is computed using the "m" preceding pages in the sliding window and compared to the key values recorded for that page in the candidate segments in which the page appears. At decision diamond 68, it is determined whether a good match of key values has been found. If so, the logic moves to block 70 to retrieve the segment with the best match. Or, the segment having the requested page at its head can be selected at block 70. In contrast, if a good match is not found at decision diamond 68, the copy of the page that is physically closest to the head of the disk drive is selected at block 72.

As intended by the preferred embodiment and as shown in FIG. 5, the pages of a cluster are physically arranged by the reorganizer module 18 on the disk 22 in reverse order of the sort that is output at block 56, such that the disk drive can commence reading data once the head is positioned over the correct track of the disk 22 and fetch a portion of the segment following the requested page without any performance penalty over fetching only the requested page. The skilled artisan will appreciate that since the output list is topologically sorted, the above-described technique can be used when it is not certain that a segment should be fetched, as may occur when the key values do not match as determined at decision diamond 68 of FIG. 4.

While the particular SYSTEM AND METHOD FOR REORGANIZING DATA ON A DISK DRIVE TO IMPROVE SPATIAL LOCALITY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for".

We claim:

1. A controller including a data storage device including a program of instructions readable by the controller for undertaking method acts comprising:

representing pages as respective vertices in a graph G having edges, the edges defining respective weights representative of a likelihood that the respective pages will be accessed contemporaneously;

defining an analysis graph C having a vertex u;

based at least on the weights of the edges adding vertices and edges to the analysis graph C; and outputting at least portions of the analysis graph C as being representative of a cluster of related pages.

2. The controller of claim 1, wherein the method acts undertaken by the controller further comprise:
using at least portions of the analysis graph C, storing related pages physically close together on a data storage medium.

3. The controller of claim 2, wherein the method acts undertaken by the controller further comprise:
topologically sorting the analysis graph C, prior to the outputting act, to render a list defining an order.

4. The controller of claim 3, wherein the method acts undertaken by the controller further comprise:
storing at least a first page physically close to:
at least a first cluster of pages related to the first page; and
at least a second cluster of pages related to the first page.

5. The controller of claim 4, wherein the method acts undertaken by the controller further comprise:
storing the first page with the first cluster and with the second cluster in a reorganized area of the storage medium while leaving the first page stored in an original location on the storage medium.

6. The controller of claim 3, wherein the vertex u of the analysis graph C is a vertex associated with a heaviest weight edge in the graph G, and the method acts undertaken by the controller further comprise:
creating a vertex w in the graph G, the vertex w representing the analysis graph C;
duplicating edges (IN(u),u) as (IN(u),w);
duplicating edges (u,OUT(u)) as (w,OUT(u));
identifying a heaviest edge originating or ending in a vertex w in the analysis graph C.

7. The controller of claim 6, wherein the method acts undertaken by the controller further comprise:
identifying a heaviest edge originating or ending in the vertex w and having an associated second vertex not present analysis graph C;
adding the associated second vertex to the analysis graph C; and
for each vertex x in the analysis graph C, removing edges between the vertex x and the associated second vertex from the graph G and adding the edges to the analysis graph C, prior to the sorting act.

8. The controller of claim 3, wherein pages of a cluster are physically arranged on a storage device in reverse of the order defined by the list.

9. The controller of claim 1, wherein the method acts undertaken by the controller further comprise:
listing a page in a lookaside directory when the page has been or is to be output during the outputting act;
receiving a subsequent request for the page; and
accessing the lookaside directory to locate the page to fulfill the request.

10. The controller of claim 1, wherein the weights are established by accessing a current page, and adding an edge from the current page to each of "N" pages accessed prior to the current page, wherein "N" is an integer great than two.

11. A computer-implemented method for clustering related data pages in close physical proximity on a data storage medium, comprising:
identifying relationships between the pages, the relationships being established by more than time of page access; and
clustering the pages based on the relationships.

12. The method of claim 11, further comprising the acts of:
representing pages as respective vertices in a graph G having edges, the edges defining respective weights representative of respective strengths of relationships between respective pages;
defining an analysis graph C having a vertex u;
based at least on the weights of the edges adding vertices and edges to the analysis graph C; and
outputting at least portions of the analysis graph C as being representative of a cluster of related pages.

13. The method of claim 12, wherein the method acts further comprise:
using at least the portions of the analysis graph C, storing related pages physically close together on a data storage medium.

14. The method of claim 13, wherein the method acts further comprise:
topologically sorting the analysis graph C to define an order.

15. The method of claim 14, wherein the method acts further comprise:
storing at least a first page physically close to:
at least a first cluster of pages related to the first page; and
at least a second cluster of pages related to the first page.

16. The method of claim 15, wherein the method acts further comprise:
storing the first page with first cluster and with the second cluster in a reorganized area of the storage medium while leaving the first page stored in an original location on the storage medium.

17. The method of claim 14, wherein the vertex u of the analysis graph C is a vertex associated with a heaviest weight edge in the graph G, and the method acts further comprise:
creating a vertex w in the graph G, the vertex w representing the analysis graph C;
duplicating edges (IN(u),u) as (IN(u),w);
duplicating edges (u,OUT(u)) as (w,OUT(u));
identifying a heaviest edge originating or ending in a vertex w in the analysis graph C.

18. The method of claim 17, wherein the method acts further comprise:
identifying a heaviest edge originating or ending in the vertex w and having an associated second vertex not present in the analysis graph C;
adding the associated second vertex to the analysis graph C; and
for each vertex x in the analysis graph C, removing edges between the vertex x and the associated second vertex from the graph G and adding the edges to the analysis graph C.

19. The method of claim 14, further comprising arranging pages of a cluster on a storage device in reverse of the order.

20. The method of claim 12, wherein the method acts further comprise:
listing a page in a lookaside directory when the page has been or is to be output during the outputting act;
receiving a subsequent request for the page; and
accessing the lookaside directory to locate the page to fulfill the request.

21. The method of claim 12, wherein the weights are established by accessing a current page, and adding an edge from the current page to each of "N" pages accessed immediately prior to the current page, wherein "N" is an integer greater than two.

22. A computer program device comprising:

a computer program storage device readable by a digital processing apparatus; and a program means on the program storage device and including instructions executable by the digital processing apparatus for performing method acts for clustering related pages on a data storage medium, the method acts comprising:

identifying pages and relationships between the pages, the relationships being established based on user accesses of the pages, the relationships further being characterized by respective weights established at least in part based on user accesses of the pages;

based on at least the weights, associating at least a first page in at least first and second clusters of related pages;

responding to a request for the first page by returning either the first or second cluster.

23. The computer program device of claim 22, wherein the method acts further comprise:

storing at least one page in more than one cluster.

24. The computer program device of claim 22, wherein the method acts further comprise:

storing the clusters on a reorganized area of a storage device separate from original storage areas of the pages.

25. The computer program device of claim 22, wherein the weights are established by accessing a current page, and adding an edge from the current page to each of "N" pages accessed immediately prior to the current page, wherein "N" is an integer greater than two.

* * * * *